US009780929B2

United States Patent
Yi et al.

(10) Patent No.: US 9,780,929 B2
(45) Date of Patent: Oct. 3, 2017

(54) METHOD AND APPARATUS FOR PERFORMING RESOURCE ALLOCATION IN WIRELESS COMMUNICATION SYSTEM

(71) Applicant: LG ELECTRONICS INC., Seoul (KR)

(72) Inventors: Yunjung Yi, Seoul (KR); Hanbyul Seo, Seoul (KR); Joonkui Ahn, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 14/761,188

(22) PCT Filed: Feb. 4, 2014

(86) PCT No.: PCT/KR2014/000944
§ 371 (c)(1),
(2) Date: Jul. 15, 2015

(87) PCT Pub. No.: WO2014/123335
PCT Pub. Date: Aug. 14, 2014

(65) Prior Publication Data
US 2015/0365209 A1  Dec. 17, 2015

Related U.S. Application Data

(60) Provisional application No. 61/769,715, filed on Feb. 26, 2013, provisional application No. 61/761,220, filed on Feb. 5, 2013.

(51) Int. Cl.
*H04W 72/02* (2009.01)
*H04W 72/04* (2009.01)
(Continued)

(52) U.S. Cl.
CPC ............ *H04L 5/0044* (2013.01); *H04L 5/001* (2013.01); *H04L 5/0098* (2013.01); *H04W 72/02* (2013.01);
(Continued)

(58) Field of Classification Search
CPC .................. H04W 72/1278; H04W 72/1284
See application file for complete search history.

(56) References Cited

U.S. PATENT DOCUMENTS

2011/0103243 A1 * 5/2011 Larsson ................. H04L 5/001 370/252
2012/0014330 A1 * 1/2012 Damnjanovic ......... H04L 5/001 370/329
(Continued)

FOREIGN PATENT DOCUMENTS

| JP | 2011-135234 A | 7/2011 | |
| KR | 10-2011-0082657 A | 7/2011 | |
| WO | WO 2011087237 A2 * | 7/2011 | ............. H04L 5/001 |

OTHER PUBLICATIONS

Author Unknown, Framework to define additional carrier type: Carrier segments, Doc. No. R1-113227, Oct. 14, 2011, pp. 1-7.*
(Continued)

*Primary Examiner* — Christopher Crutchfield
(74) *Attorney, Agent, or Firm* — Dentons US LLP

(57) ABSTRACT

A method for and apparatus for performing resource allocation in a wireless communication system is provided. The apparatus includes receiving a configuration of an entire system bandwidth including a predefined system bandwidth and a carrier segment in which is allocated in not available region for the predefined system bandwidth; checking an indication to indicate whether the entire system bandwidth is available or not for the UE, and information for the entire system bandwidth in the configuration; and receiving a
(Continued)

reference signal and a control signal at subframes determined based on the indication and the information.

13 Claims, 11 Drawing Sheets

(51) Int. Cl.
    *H04W 72/12*     (2009.01)
    *H04L 5/00*     (2006.01)

(52) U.S. Cl.
    CPC ... *H04W 72/0446* (2013.01); *H04W 72/1278* (2013.01); *H04W 72/1284* (2013.01); *H04L 5/005* (2013.01); *H04L 5/0053* (2013.01)

(56) References Cited

U.S. PATENT DOCUMENTS

2012/0263117 A1    10/2012   Love et al.
2012/0320843 A1*  12/2012   Kim .................. H04L 5/001
                                                                  370/329

OTHER PUBLICATIONS

Author Unknown, Benefits of carrier segments, Doc. No. R1-100669, Jan. 22, 2010, pp. 1-3.*
"Additional Carrier Types for Rel.11"; 3GPP TSG RAN WG1 #66, Athens, Greece, R1-112504, May 22-26, 2011.
"Additional Carrier Types for Rel.11"; 3GPP TSG RAN WG1 #66bis, Zhuhai, China, R1-113083, Oct. 10-14, 2011.

* cited by examiner

US 9,780,929 B2

METHOD AND APPARATUS FOR PERFORMING RESOURCE ALLOCATION IN WIRELESS COMMUNICATION SYSTEM

This application is a 35 USC §371 National Stage entry of International Application No. PCT/KR2014/000944 filed on Feb. 4, 2014 and claims priority to U.S. Provisional Application No. 61/761,220, filed Feb. 5, 2013, and U.S. Provisional Application No. 61/769,715, filed Feb. 26, 2013 all of which are incorporated by reference in their entirety herein.

BACKGROUND OF THE INVENTION

Field of the Invention

The present invention relates to wireless communications, and more particularly, to a method and apparatus for performing resource allocation in a wireless communication system consisting of multiple carriers over single frequency or multiple frequencies.

Related Art

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes.

An efficient operation scheme for the cell planning including a new carrier which is necessarily transmitted restricted (or eliminated) controls and UE in a small cell cluster environment needs to be defined. Furthermore, it is need to be defined a new system bandwidth to maximize the spectrum efficiency.

SUMMARY OF THE INVENTION

The present invention provides a method and apparatus for performing resource allocation in a wireless communication system.

The present invention also provides a method and apparatus for allocating carrier segment(s) in a wireless communication system.

In an aspect, a method for performing resource allocation in a wireless communication system is provided. The method may includes receiving a configuration of an entire system bandwidth including a predefined system bandwidth and a carrier segment in which is allocated in not available region for the predefined system bandwidth; checking an indication to indicate whether the entire system bandwidth is available or not for an user equipment (UE), and information for the entire system bandwidth in the configuration; and receiving a reference signal and a control signal at subframes determined based on the indication and the information.

The method may further include that the configuration of the entire system bandwidth is received by a serving cell (Scell) configuration, a transmission mode (TM) configuration, or a radio resource control (RRC) configuration.

In another aspect, an user equipment (UE) for performing resource allocation in a wireless communication system is provided. The UE includes a radio frequency (RF) unit for transmitting and receiving a radio signal; and a processor operatively coupled to the RF unit, wherein the processor is configured for: receiving a configuration of an entire system bandwidth including a predefined system bandwidth and a carrier segment in which is allocated in not available region for the predefined system bandwidth; checking an indication to indicate whether the entire system bandwidth is available or not for the UE, and information for the entire system bandwidth in the configuration; and receiving a reference signal and a control signal at subframes determined based on the indication and the information.

The proposed embodiment supports that a user equipment can support a new system bandwidth to maximize spectrum efficiency.

DESCRIPTION OF EXEMPLARY EMBODIMENTS

Figure 1:
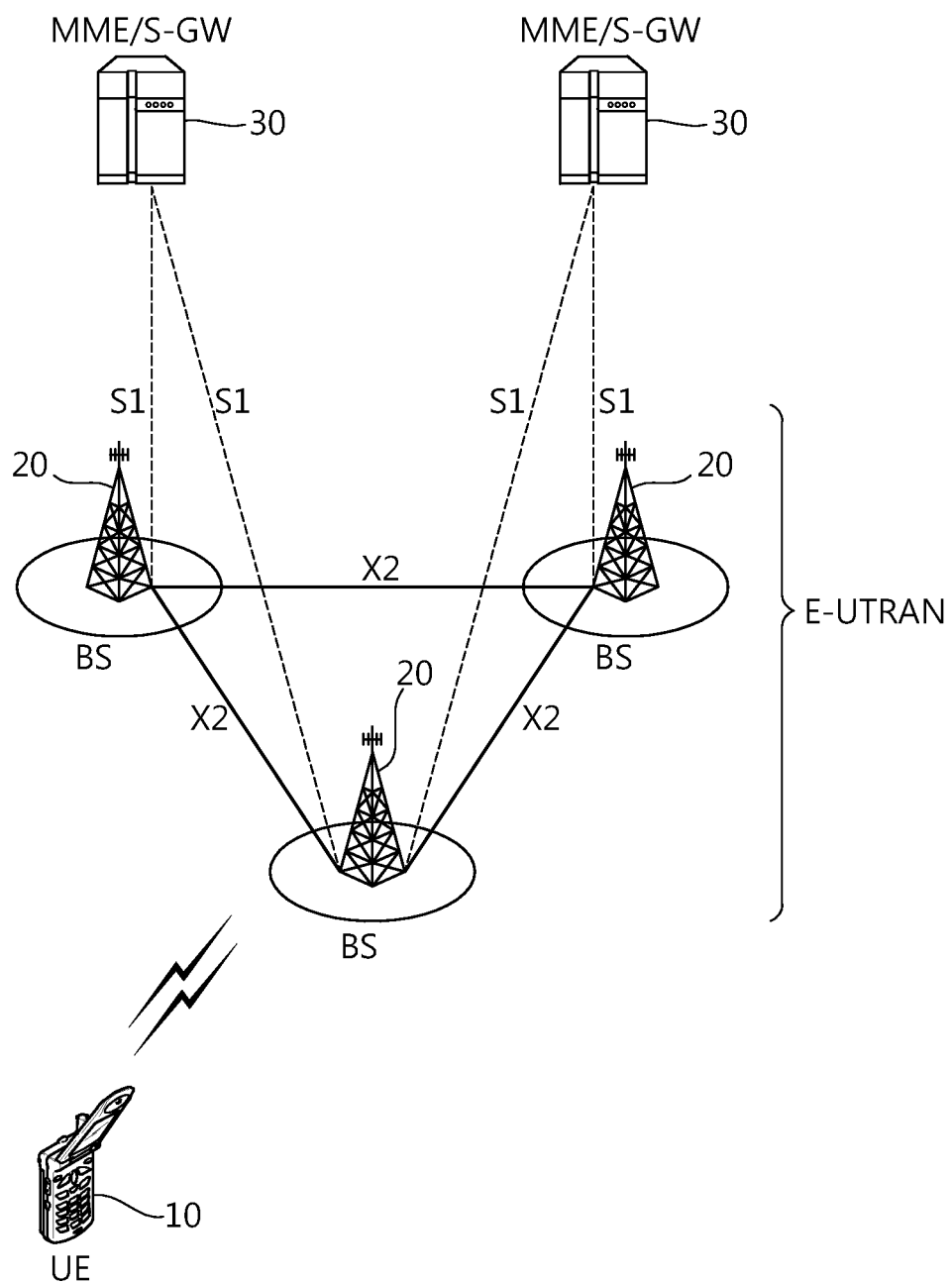
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
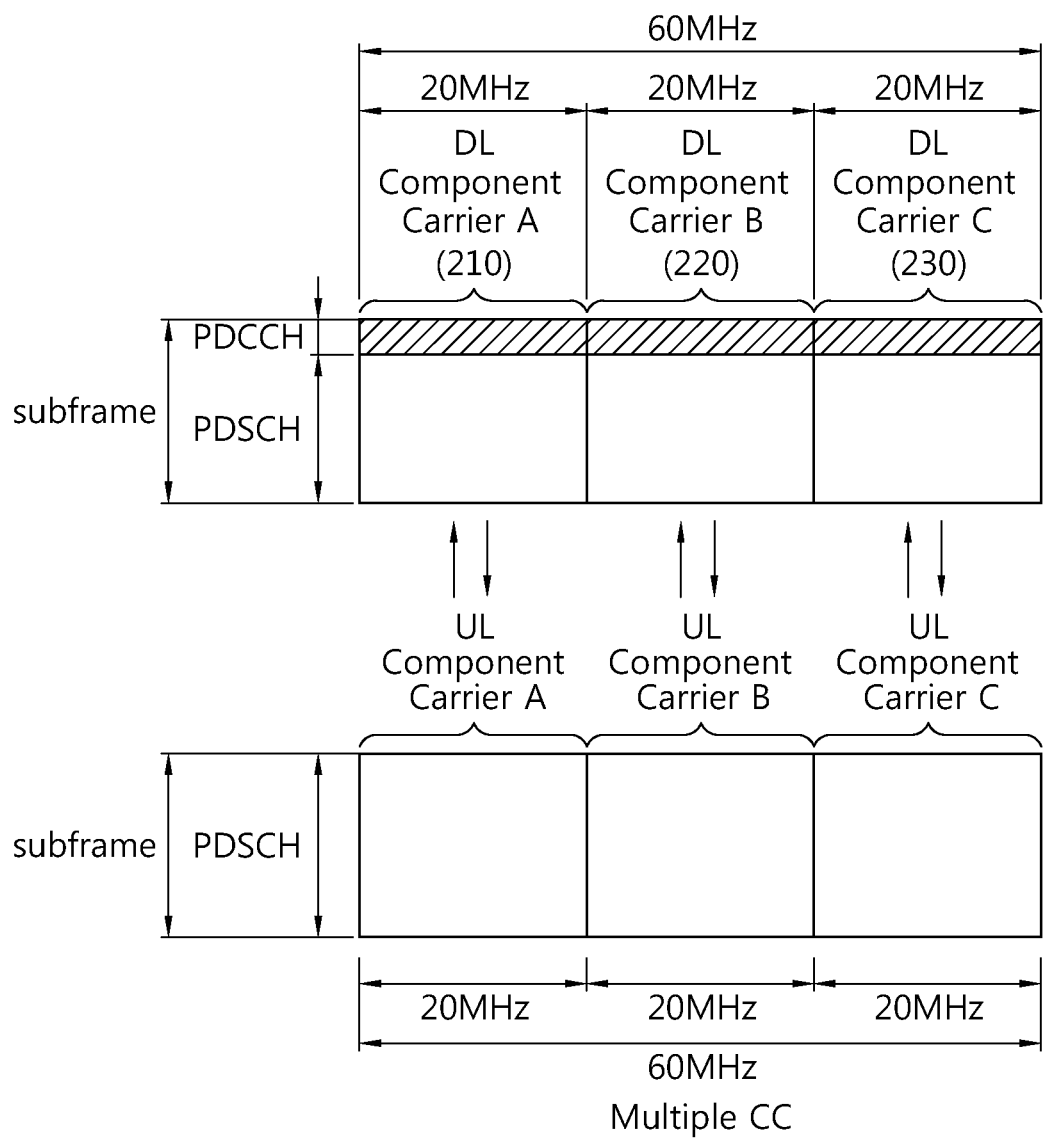
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the DL/UL subframe structure considered in 3GPP LTE-A (LTE-Advanced) system where multiple CCs are aggregated in this example, 3 carriers existed is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

Hereinafter, a CC may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available. Furthermore, the PCC can be also activated or deactivated using an indication of activation/Deactivation as a bit. The UE can camp on the PCC as a Primary serving cell (Pcell) at first in initial access. The UE may use only one primary component carrier or one or more secondary component carriers along with a primary component carrier. The UE may be allocated a primary component carrier and/or a secondary component carrier from the BS. A UE can be configured with multiple carrier groups where each group may have one PCell which is activated all the time and PUCCH can be transmitted to. For a convenience, those cells can be called as PCell. For example, if two carrier groups are exist, there could be PCell for the first group and S-PCell which is the PCell for the second group.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or a RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state. If the SCell is deactivated, it includes not transmit SRS on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, . . . , 7 for a serving cell index 1 corresponds to a 7th bit from the left, which are the remaining indices other than 0, i.e., the index of the Pcell. Herein, the index of the serving cell may be a logical index determined relatively for each UE, or may be a physical index for indicating a cell of a specific frequency band. The CA system supports a non-cross carrier scheduling (self-carrier scheduling), or cross carrier scheduling.

To enhance the user throughput, it is also considered to allow inter-node resource aggregation over more than one eNB/node where a UE may be configured with more than one carrier groups. In such cases, it is also feasible to configure PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 (which is master PCell) cannot be used for activation/deactivation. More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation.

To make some distinction between PCell for the first carrier group and the second carrier group, the PCell for the second carrier group can be noted as a S-PCell hereinafter. Herein, the index of the serving cell may be a logical index determined relatively for each UE, or may be a physical index for indicating a cell of a specific frequency band. The CA system supports a non-cross carrier scheduling (self-carrier scheduling), or cross carrier scheduling.

Figure 3:
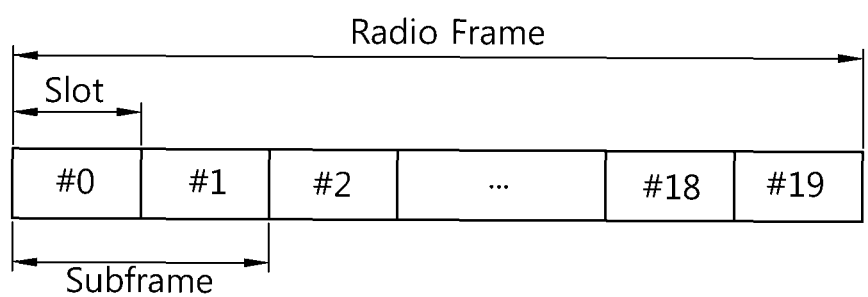
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

Figure 4:
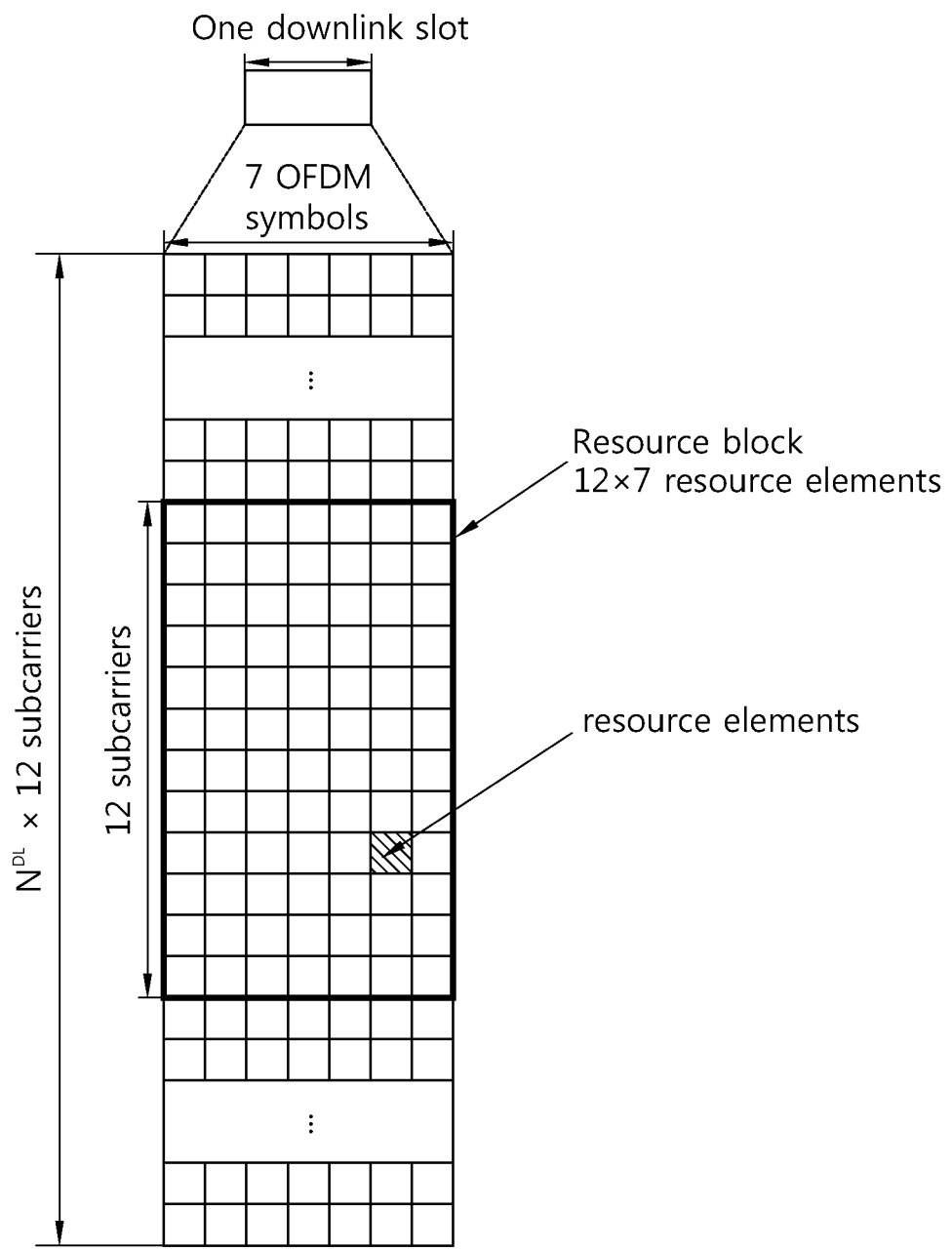
FIG. 4 is an exemplary diagram showing a resource grid for one downlink slot to which the present invention is applied.

FIG. 4 is an exemplary diagram showing a resource grid for one downlink slot to which the present invention is applied.

Referring to FIG. 4, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 (or 6) REs. The number NDL of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 5:
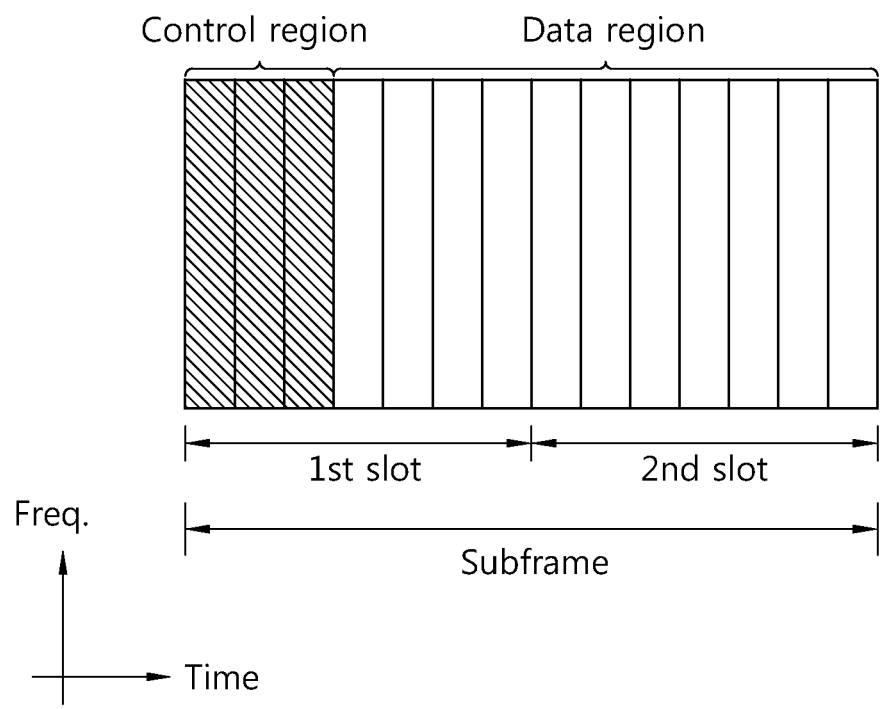
FIG. 5 shows a structure of a downlink subframe to which the present invention is applied.

FIG. 5 shows a structure of a downlink subframe to which the present invention is applied.

Referring to FIG. 5, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

Figure 7:
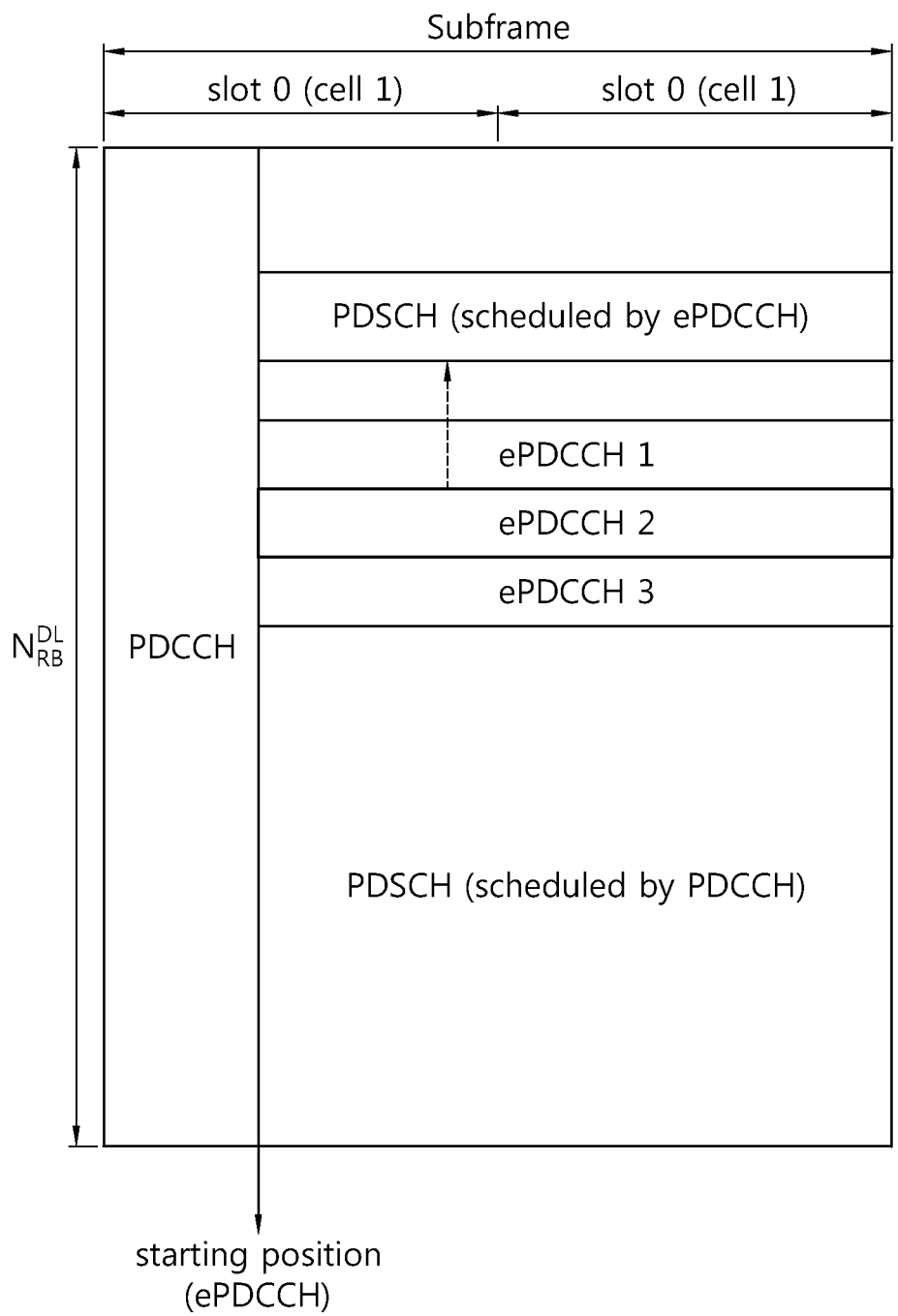
FIG. 7 shows downlink control channels to which the present invention is applied.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. Here, the ePDCCH is shown in FIG. 7 more details.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a 10th bit to 23rd bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

Carrier indicator—0 or 3 bits
Flag for identifying Format 0/Format 1A—1 bit, 0 indicates Format 0, 1 indicates Format 1A.
Frequency hopping flag—1 bit, is a Most Significant Bit (MSB) corresponding to resource allocation at need and used to assign multiple clusters.
Resource block assignment and hopping resource allocation - $|\log_2(N_{RB}^{UL}(N_{RB}^{NL} + 1)/2)|$ bits
  PUSCH hopping (corresponding to only single cluster assignment):
    $N_{UL\_hop}$ MSBs are used to obtain an $n_{PRB}(i)$ value.
    $(|\log_2(N_{RB}^{UL}(N_{RB}^{UL} + 1)/2)| - N_{UL\_hop})$ bits provide the resource allocation of the first
slot of an uplink subframe.
  In single cluster assignment, non-hopping PUSCH
    $(|\log_2(N_{RB}^{UL}(N_{RB}^{UL} + 1)/2|)$ bits provide the resource allocation of an uplink subframe.
  In multi-cluster assignment, non-hopping PUSCH: Resource assignment is obtained from a combination of a frequency hopping flag field and a resource block assignment and hopping resource allocation field.

$\left\lceil \log_2\left(\left(\frac{\lceil N_{RB}^{UL}/p + 1\rceil}{4}\right)\right)\right\rceil$ bits provide resource allocation in an uplink subframe.
Wherein, P depends on the number of downlink resource blocks.
Modulation and coding scheme/redundancy version—5 bits
New data indicator—1 bit
TPC command for a scheduled PUSCH—2 bits
Cyclic shift and OCC index for DM RS—3 bits
Uplink index—2 bits, only exist for a TDD operation, that is, an uplink-downlink configuration 0
Downlink Assignment Index (DAI)—2 bits, only exist for TDD operations, that is, uplink-downlink configurations 1-6
CQI request—1 or 2 bits, a 2 bit field is applied to a UE configured using at least one downlink cell.
SRS request—0 or 1 bit.
Multi-cluster flag—1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

Figure 6:
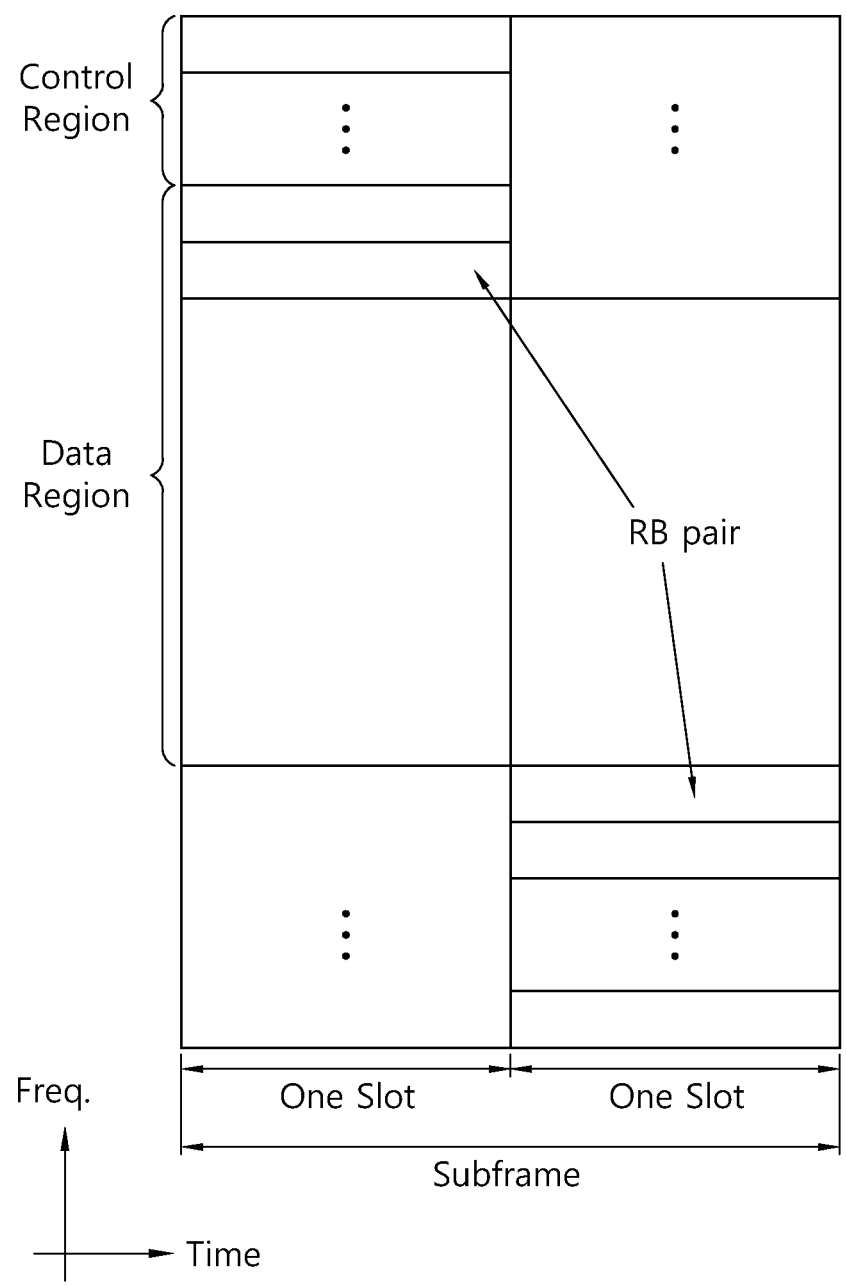
FIG. 6 shows an example of a structure of an uplink subframe carrying an ACK/NACK signal to which the present invention is applied.

FIG. 6 is a view illustrating an example of a structure of an uplink subframe carrying an ACK/NACK signal to which the present invention is applied.

Referring to FIG. 6, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

The ePDCCH can be one of solutions of limitation for a PDCCH transmission or new control information transmission of near future commination system including a new type of carrier as shown in FIG. 7. The ePDCCH which can be multiplexed with the PDSCH can support multiple Scells of the CA.

Referring to FIG. 7, the ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

As described, in the new carrier, a special subframe may not have legacy PDCCH and starts PDSCH at first OFDM symbol, the number of OFDM symbols used in PDSCH in special subframe is increased to 8-11 from 7-10 in normal CP. When the number of OFDM symbols is equal to or greater than 11 which is the basis of TBS calculation in normal subframe in normal carrier, the scaling factor may be increased to 1. Furthermore, this invention proposes to use OFDM symbol 0, 1 for CSI-RS REs. The CSI-RS can be used for Radio Resource Management (RRM), fine time/frequency tracking and/or interference measurement. In small cell environments where small cells are densely deployed, the CSI-RS in current specification may not be sufficient to perform those functions as there are a large number of neighbor small cells which like to use orthogonal resources.

For this next LTE system or enhanced communication system, this invention provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only.

It can be applied to legacy carriers without the loss of generality as well. More details, this invention considers cases where cell-specific RS used for tracking and the RRM measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where PSS/SSS/CRS or a discovery signal based on CSI-RS is transmitted every T msec with a predetermined value e.g., T=200, or more than 200.

Figure 8:
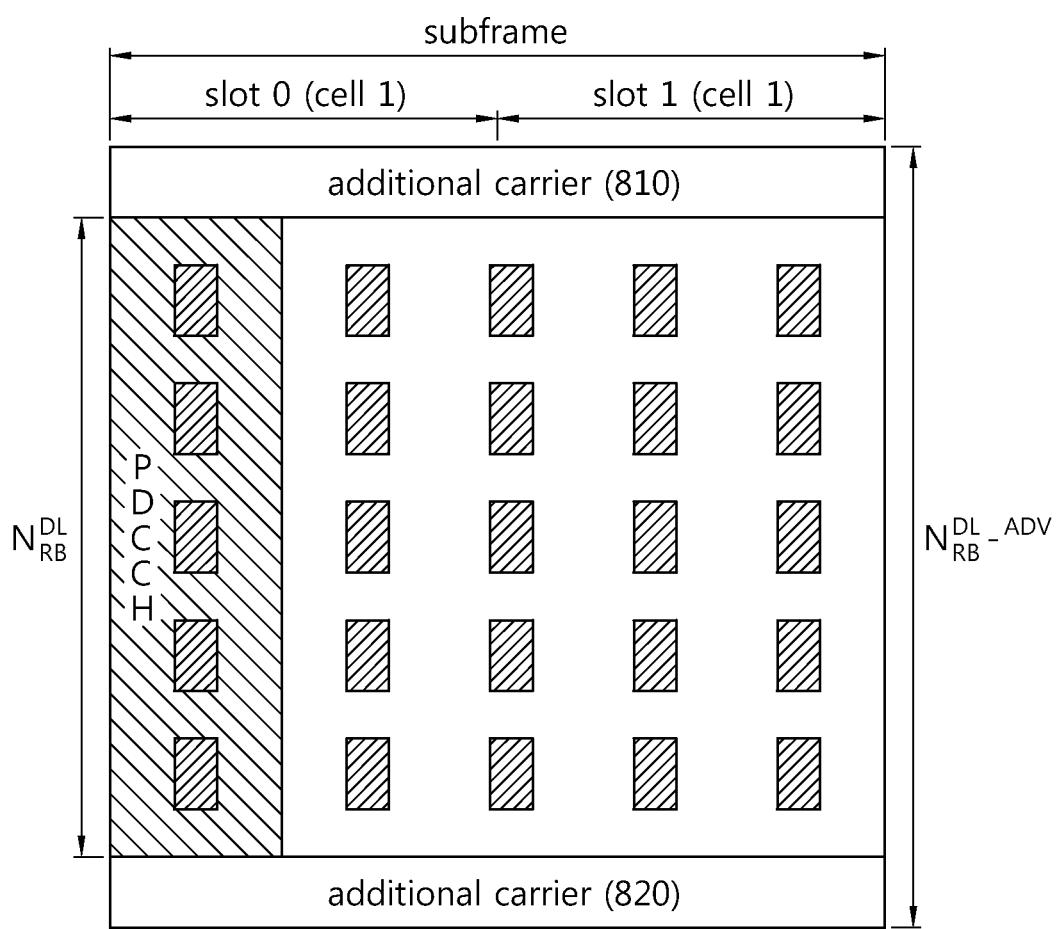
FIG. 8 and FIG. 9 shows examples of allocating carrier segment(s) which the present invention is applied.
Figure 9:
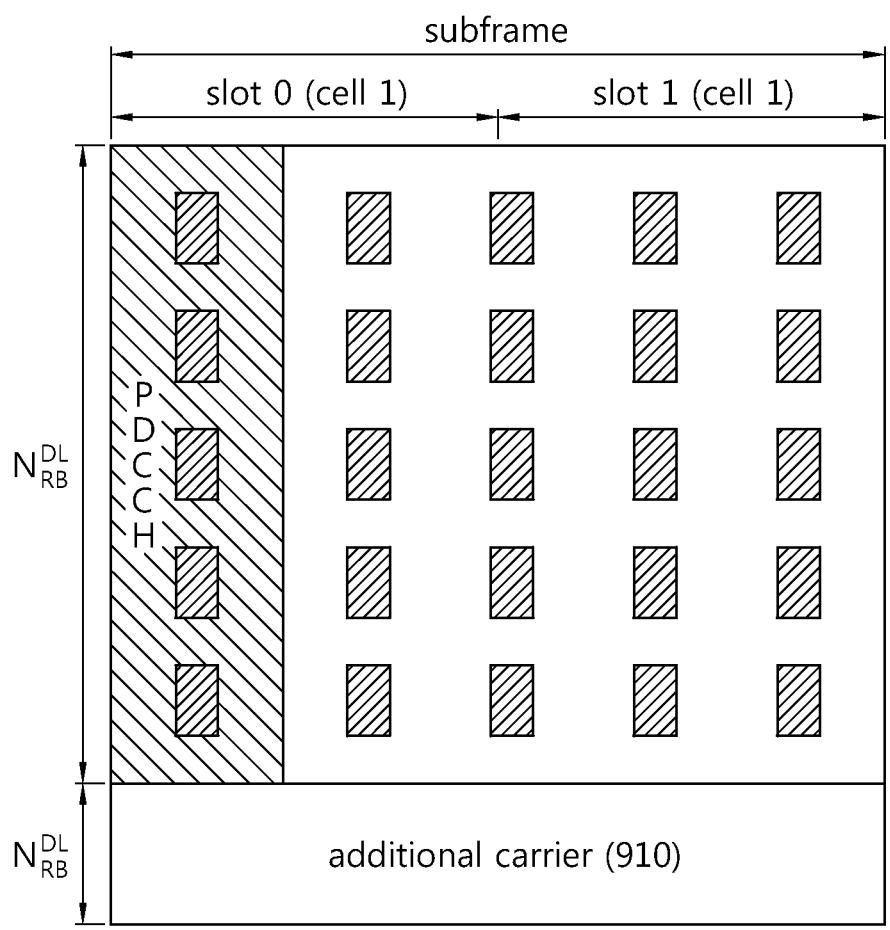

Furthermore, there are some interests defining a new system bandwidth such as 6 Mhz to maximize the spectrum efficiency. As existing UE may not support a new system bandwidth, a concept to allow co-existence of legacy system bandwidth and the new system bandwidth may be necessary. Three options are feasible to support this, one is a CA based approach with no PSS/SSS/CRS transmitted in a new carrier which are not accessed by a legacy UE (e.g., CA of 5 Mhz carrier+1 Mhz carrier), the other is a carrier segment where additional spectrum can be used as data RBs only instead of creating a new carrier where some examples are as shown in FIG. 8 and FIG. 9.

The LTE-Advanced system as described is set to a wide range of services to meet the requirements of next-generation wireless communication systems by using up to five component carriers with a CA scheme commonly, here, the system bandwidth of 20 MHz can be used for as one component carrier normally, that is, the area assigned to one of the elements of the carrier is up to 20 MHz. As set to 20 MHz for LTE system or next system, but the actual maximum available system bandwidth to implement 20 MHz, the entire frequency band (full-frequency band) than the small area can expand or shrink depending on the situation of the implementation of the system. In other words, some areas are not using as for less than 20 MHz system band. To support this issues and more efficient spectrum maximization, the system bandwidth in the embodiment includes to be used in a carrier segment (segment carrier) as additional carrier (810, 820, 910), and the carrier element by setting the expansion of these areas, take full advantage of up to 20 MHz frequency band or further expanded system bandwidth. That is, these segments or carrier region is intended to be used to expand the area of system resources that are not currently in use of the available system bandwidth refers to all resources. This proposed embodiment supports these segment carriers each to add spectrums regardless of how it is aggregated either by carrier aggregation or carrier segment. It can be applied to uplink as well with same following schemes. Both approaches are applicable to extend uplink spectrum as well.

Firstly, the segment carrier of characteristics is described. For Synchronization, an advanced UE is not required to perform a separate synchronization on this additional carrier either with CA based approach or carrier segment based approach. An advanced UE is also not required to perform a separate Radio Link Monitoring (RLM) on this additional carrier, and Radio Resource Management (RRM) on this additional carrier. If the RRM is not configured on this additional carrier, only RRM results on the legacy carrier portion are performed. When a UE is configured with an additional carrier, in terms of configuring wideband RSRQ (Reference Signal Received Quality)/RSRP (Reference Signal Received Power), it can include additional carrier system bandwidth as well. For example, if a legacy carrier portion of a system bandwidth is 5 Mhz and additional carrier portion of a system bandwidth is 1 Mhz, a wideband RSRQ and/or RSRP can include 6 Mhz to support the full bandwidth combining both legacy and additional carrier portion.

Uplink timing adjustment (or advanced) (TA) for this additional carrier follows the legacy carrier. In other words, the same TA is used for both legacy carrier portion and additional carrier portion. Random access procedure is not supported in this additional carrier. As timing adjustment is not necessary, random access does not have to be supported. In other words, PRACH configuration used for additional carrier separately from the legacy carrier will not be configured. However, PRACH initiated by PDCCH order may be transmitted using additional carrier resource if a UE is configured with resource in additional carrier.

And uplink power control is shared between legacy carrier and additional carrier. With CA-based approach, a separate power control may be used. However, it is desirable to apply the same power control for both legacy and additional carrier. For downlink power control, separate referenceSignalPower can be informed to a UE for legacy carrier and additional carrier separately. The common ratio of PDSCH EPRE to cell-specific RS (referenceSignalPower) can be used for both carriers. Alternatively, the ratio of PDSCH EPRE to cell-specific RS for additional carrier can be different from the legacy carrier's. The reason of this required would be to allow no CRS transmission in additional carrier (or additional resource blocks) portion and thus relative power between PDSCH and CRS would be different in that region.

Especially, Transmission mode is defined such that a different transmission mode for additional carrier from legacy carrier can be configured. This may be limited to a case where PDSCH is not scheduled cross both legacy and additional carrier. Even though a UE is configured with different TM for each carrier, if resource is allocated across two carriers, transmission mode configured for legacy carrier should be assumed for decoding the data. If it is not configured, a UE shall assume the same transmission mode configured for legacy carrier is used for the additional carrier as well. Or, alternatively, transmission mode for a UE when additional carrier is configured is TM10 based TM (DM-RS based approach) or TM9 based transmission mode. Even without reconfiguration of TM, a UE may assume TM9 or TM10 as a baseline when the additional carrier is configured. The motivation of having independent TM configuration for each carrier is to allow efficient data demodulation where additional carrier may not carry CRS and thus DM-RS based TM would be more appropriate. When additional carrier is configured with CRS-based TM (such as TM1-4), a UE can assume that CRS will be transmitted in additional carrier portion as well according to MBSFN configuration of legacy carrier.

When a UE is assigned with additional carrier via RRC configuration, e.g., attach as a SCell or add additional RBs via RRC configuration, the fallback system bandwidth with DCI 1A is the legacy system bandwidth. In other words, a UE expects that DCI 1A resource allocation is only for a legacy carrier system bandwidth. Other DCIs such as DCI format 2C/2D can be used to schedule data throughout the new system bandwidth which is sum of legacy system bandwidth and additional carrier system bandwidth if carrier segment is used. Fallback with DCI 1A can be based on CRS transmitted on the legacy carrier. Alternatively, when a UE is signaled with additional carrier by MIB or SIB, it may assume that the fallback bandwidth is also for the new bandwidth (legacy+additional carrier). Another option is to determine fallback mode based on resource allocation. If resource allocation includes only PRBs in legacy carrier, it use CRS based fallback. Otherwise, it may fallback with DM-RS. This however requires UE blind decoding of both system bandwidths to successfully detect whether resource has been allocated to additional carrier portion as well. Alternatively, if carrier segment is used, DCI 1A may still use full system bandwidth including both legacy and additional carrier bandwidth and fallback behavior is determined based on TM configured to the UE. Even in this case, DCI1A scheduled via CSS to support potential legacy UEs, can be assumed with legacy carrier system bandwidth rather than the sum of two carriers. This would be more aligned with option to configure additional resource via MIB or SIB.

One option for uplink DCI handling is to allow the legacy system bandwidth scheduled by DCI format 0. This is to align the size of DCI1A and DCI 0. However, the total system bandwidth if additional carrier is configured to the UE can be used for DCI 0 as well where PUSCH resource can be allocated to additional carrier portion. In this case, padding becomes an issue during RRC reconfiguration period. To avoid this issue, one solution may be to assign larger uplink bandwidth by MIB/SIB even for legacy UEs if the system may use additional carrier. Thus, both legacy UE and advanced UE use uplink bandwidth same to the total of additional carrier and legacy carrier portion. However, by scheduling and proper configuration, legacy UE will not use additional carrier portion for uplink transmission. In this case, proper padding can be achieved based on the assumption of different UL and DL system bandwidth. Or, if larger bandwidth with additional uplink carrier is used, a new DCI format or DCI format 4 may be used. Alternatively, if additional carrier is configured or indicated by system information to the advanced UE, it may assume that the full system bandwidth (legacy BW+additional carrier BW) is used for all resource allocation including DCI format 0.

Different TM configurations by PDCCH and ePDCCH set respectively are considered. When this approach is used, additionally, system bandwidth supported by each control channel can be different as well. For example, PDCCH based on CRS can support TM 2 for a UE with legacy system bandwidth whereas ePDCCH based on DM-RS can support TM 10 for the same UE with larger system bandwidth (by including additional carrier portion). When this applies, both PDCCH USS and ePDCCH USS may co-exist in the same subframe which may increase the number of blind decoding of a UE. Alternatively, the same rule of Rel-11 where PDCCH USS and ePDCCH USS would not coexist in the same subframe may be kept. In other words, PDCCH and ePDCCH can schedule different number of resource blocks and/or using different transmission modes. To support efficient feedback, separate feedback for PDCCH monitoring subframe and ePDCCH monitoring subframe would be needed by configuring either two CSI processes (one for each set) or by configuring two subsets of subframes (one set for each).

PBCH modification to indicate additional carrier BW is supported. Using the reserved bits, additional carrier BW may be advertised to advance UEs. One example of representation of additional carrier BW is to use the ratio between legacy carrier BW and additional carrier BW (e.g., 10%, 20%, 30%, 40%, 50%). Another example is to use the number of PRBs.

If segment carrier is used, the same CSI-RS configuration, e.g., CSI-RS configuration index and subframe/offset configuration can be used for additional carrier as well. Alternatively, a different configuration may be configured to additional carrier in which case additional signaling/configuration is given to the UE. CSI-RS configuration refers to the CSI-RS pattern and subframes where CSI-RS is transmitted. For CA-based approach, the same CSI-RS configuration will be used unless additional CSI-RS configuration is given to a UE for the additional carrier. The same thing may apply to both non-zero-power CSI-RS and zero-power CSI-RS. Alternatively, a UE may assume that zero-power CSI-RS is not transmitted in additional carrier portion. Thus, if UE assumes the same CSI-RS configuration in both carriers, only non-zero-power CSI-RS configurations are assumed to be inherited in additional carrier. Alternatively, a UE may be higher layer configured with the behavior for ZP CSI-RS in additional carrier whether to follow legacy carrier ZP CSI-RS configuration or not.

Further, MBSFN configuration for additional carrier can be different from legacy carrier. MBSFN configuration here refers to the set of MBSFN subframes configured to the UE (40 bits in FDD). A separate configuration on additional carrier MBSFN configuration can be configured. If no additional configuration is given, a UE may assume that all subframes can be used for MBSFN subframes in additional carrier. If the same configuration applies to the additional carrier from the legacy carrier, UE is informed about the configuration. Alternatively, UE may assume that the same MBSFN subframe configurations are applied to both legacy and additional carriers if no additional configuration for additional carrier is given. For an advanced UE, in MBSFN subframes configured in legacy carrier may expect to receive MBMS in both legacy and additional carrier and in non-MBSFN subframes in legacy carrier, it may expect to receive MBMS only in additional carrier.

Power control of ρA or ρB may be applied to legacy carrier and additional carrier separately. The different values can be even configured. If there is no cell-specific RS is transmitted in additional carrier, all OFDM symbols are treated as if MBSFN subframe OFDM symbols. Alternatively, power control or ratio decision between PDSCH EPRE and cell specific RS is a similar issue to a case where CRS is transmitted via only sub-band or different numbers of ports are transmitted to the subband and the wide-band.

Power control options include "separate signaling of PB or UE may assume that only subband carries boosted CRS or etc". It notes that power boosting techniques to cover the cases (1) CRS transmitted in legacy carrier in all subframes+no CRS in additional carrier (2) CRS transmitted in legacy carrier in all subframes+tracking RS in additional carrier every 5 msec or less or large periodicity (3) CRS (multi-port) transmitted in legacy carrier in all subframes+CRS single port transmitted in additional carrier in all subframes.

A UE is not expecting to receive PDCCH in additional carrier, but the UE may expect to receive ePDCCH in both legacy carrier and additional carriers. One ePDCCH set can be configured across both legacy and additional carriers. In this case, a specific rule is needed to define the number of REs available for ePDCCH because the ePDCCH search space and candidate locations can be dependent of this number, e.g., they can be different when the number of available REs is greater than a certain threshold and when the number is smaller than the threshold. When there are PRBs with the number of available REs≥Xthresh and PRBs with the number of available REs<Xthresh, e.g., Xthresh=104 in special subframe configuration, the aggregation level and everything follows the case with available REs<Xthresh. Alternatively, it can follow REs≥Xthresh. Depending on the ratio of the number of PRBs with available REs less than Xthresh, it can be determined. For example, if the ratio is less than 50%, the rule follows the case with # available REs≥Xthresh. Otherwise, it follows # available REs≥Xthresh. Alternatively, the # of available REs follows the legacy carrier regardless of whether any legacy carrier PRB is assigned to an ePDCCH set or not. Alternatively, it may follow the legacy carrier only if at least one PRB from legacy carrier is configured to an ePDCCH set. Alternatively, for the simplicity, ePDCCH PRBs can be configured only to legacy carriers or a given ePDCCH set contains PRBs in either legacy carrier or additional carrier. Note that 104 represented here is a Xthresh which can be changed with different number. This is just an example to determine behavior where Xthresh can be altered. Then, a UE may not expect to decode any CSS in additional carrier as ePDCCH CSS.

Meanwhile, a UE may assume that PRB bundling is used only for a legacy carrier portion for DM-RS PRB bundling. Or, the PRB bundling is used over PRBs which are physically adjacent. Moreover, PRB bundling across legacy carrier and additional carrier may not be performed. Separate PRB bundling can be performed in legacy carrier and additional carrier. For example, as shown in FIG. 8, if additional carriers are allocated in each edge of frequency, PRB bundling will be performed in each segment, totally, three segments including one additional carrier+one legacy+one additional carrier. The bundling size would follow the legacy carrier bandwidth or alternatively additional carrier follows the bandwidth of additional carrier. Alternatively, PRB bundling may be applied with an assumption that the new bandwidth is contiguous. RBG size may be determined based on the legacy carrier bandwidth or a new system bandwidth (additional carrier BW+legacy carrier BW). Resource allocation over new bandwidth (additional carrier BW+legacy carrier BW) will be either limited only to USS or it may not be applicable to DCI with SI-RNTI, RA-RNTI, P-RNTI, SPS-RNTI, etc. In other words, it may be applicable on with C-RNTI or USS. Furthermore, if an advanced UE is configured with transmission mode which is based on CRS, this extension of resource allocation may not be applicable even though the UE is configured with additional resource blocks. In that case, UE shall assume that additional carrier would not be used for any PDSCH transmission. The same assumption shall be applied to ePDCCH minimum aggregation level decision. When a UE is configured with transmission mode based on CRS, the system bandwidth shall be based on legacy carrier bandwidth rather than the extended system bandwidth with consideration of additional carrier.

All sub-band size determination and feedbacks as CSI feedback would be dependent on a new system bandwidth (additional carrier BW+legacy carrier BW). For wideband CQI, exceptionally, system bandwidth may be limited only to legacy carrier. Or, additional wideband CQI for legacy carrier bandwidth only can be configured. Or a UE reports wideband CQI for full (new) system bandwidth. When additional carrier is configured, new system bandwidth for CSI feedback is determined by the valid downlink subframe. In other words, the valid downlink subframe allocates resource including both legacy and additional carrier, new BW is used. Otherwise, legacy BW is used for CSI feedback.

When PDCCH and ePDCCH schedule different transmission mode, a CQI may be calculated and reported separately for each transmission mode. When a UE reports one CQI for both legacy carrier and additional carrier, a UE shall assume the followings for the purpose of deriving the CQI index. The first 3 OFDM symbols are occupied by control signaling within legacy carrier bandwidth. Additional carrier would not carry legacy control signaling. Assume no ePDCCH. Alternatively, for the simplicity, first 3 OFDM symbols for control signaling can be assumed for both legacy and additional carrier. In other words, the first 3 OFDM symbols are occupied by control signaling within the allocated system bandwidth to the UE.

IMR configuration for legacy carrier and additional carrier can be different. If there is no separate configuration is given to additional carrier, the same configuration with legacy carrier can be assumed. For example, IMR configuration consists of the RE pattern from non-zero-power CSI-RS configurations and subframe configurations for transmitting CSI-RSs.

For legacy carrier PRBs, UE may assume that it is determined by either ePDCCH starting position or PCFICH. For additional carrier PRBs, UE may assume that either higher layer signaling to indicate the starting symbol for PDSCH region is given or zero is assumed. Default behavior can follow PCFICH.

MBSFN usage in additional carrier can be defined that MBMS configuration may configure the subband where MBMS services are transmitted. Without additional MBSFN configuration, UE shall assume all subframes are MBSFN capable for additional carrier portion. A MBMS service for a legacy UE can be transmitted over the entire legacy system bandwidth. For a MBMS service for an advance UE can be transmitted either over only the legacy carrier (subband or full band) or combination of legacy and additional carrier (subband or full band) or additional carrier (subband or full band).

PRS can be configured in additional carrier as well. Alternatively, to support RRC Idle mode UEs, PRS may be limited only to legacy carrier BW. PRB index for additional carrier: if carrier segment is used, PRB index for additional carrier starts with $N_{RB}^{DL}$ of legacy carrier such that $N_{RB}^{DL}$, $N_{RB}^{DL}+1, \ldots N_{RB}^{DL}+N_{RB}^{DL\ AdditionalCarrier}-1$.

When resource allocation is done for both legacy and additional carrier PRBs, TBS calculation may follow the legacy carrier PRB allocation or additional carrier PRB allocation or mixed of two. For example, if PDSCH is transmitted over 5 legacy carrier and 5 new carrier PRBs, TBS size may calculated (assuming normal subframe) as TBS with NPRB=5+TBS with C*NPRB=6 (e.g., C=1.2) assuming TBS calculation is different on legacy carrier and additional carrier respectively. In other words, TBS calculation may follow the rule per each PRB depending on whether PRB belongs to legacy carrier or additional carrier.

When a unified starting symbol for ePDCCH and/or PDSCH is used regardless of legacy carrier and additional carrier, one mechanism to utilize the unused portion in additional carrier would be to transmit uplink grant ePDCCH. In other words, if PDSCH can be scheduled following the same OFDM symbol number as in legacy carrier (e.g., OFDM symbol 3), there are a few OFDM symbols not used for either PDCCH or PDSCH. Thus, those REs can be used for ePDCCH transmission if ePDCCH RE mapping over a few OFDM symbols are supported.

In PQI configuration, the system bandwidth of legacy carrier or system bandwidth of additional carrier can be configured where additional carrier portion may be assumed that CRS is not transmitted. When system bandwidth is assumed to be the same among CoMP participating TPs, if carrier segment is configured as an additional carrier to the UE, UE may assume that the same BW carrier segment is configured for all TPs as well. Or, it may be indicated by higher layer signaling which BW to be used for non-serving cell TPs. Or, it may assume that only legacy portion will be used for CoMP operation. In other words, when DCI 2D is used, resource allocation will be limited to legacy carrier BW regardless of additional carrier configuration. Alternatively, the system bandwidth may be reconfigured or changed according to QCL behavior. If QCL behavior is type A (where CSR-CSI-RS and DM-RS are quasi-collocated in large scale properties), sum of two carriers's bandwidth is assumed as system bandwidth. If QCL behavior is type B (CSI-Rs and DM-RS are QCLed), legacy carrier's system bandwidth is assumed as system bandwidth.

In PDSCH rate matching around CRS in CoMP scenario, different rate matching may be used for legacy carrier and additional carrier separately where additional carrier the UE may not assume rate matching around CRS. Alternatively, regardless of legacy or additional carrier, the same starting position and same PDSCH rate matching around CRS can be assumed based on legacy CRS. The REs in additional carrier rate matched will not be used for data transmission. A UE may be configured with the assumption on rate matching whether additional carrier is treated differently or not. In case additional carrier and legacy carrier are treated equally, regardless of starting symbol configuration of PDSCH, it shall follow configurations for the legacy carrier. Further, PDSCH rate matching behavior in MBSFN subframes configured in the associated PQI shall be applied to both legacy and additional carrier regardless of separate configuration feasible to additional carrier or not. In other words, starting symbol decision and CRS rate matching shall be determined by the legacy carrier.

When SPS is configured, the resource block in additional carrier may be used. If a UE is configured with transmission mode based on CRS demodulation, UE may assume that invalid SPS configuration is given. Or, UE may assume additional carrier also carries CRS. In this case, UE may further assume that the number of CRS ports is the same to that of legacy carrier.

When ePDCCH is configured and additional carrier is added to uplink as well, Application Resource Optimizer (ARO) values may be changed (e.g., can have large range to include additional carrier portion) so that additional carrier PRBs can be used for PUCCH region without changing any PUCCH offset configured in legacy carrier.

PDSCH starting symbol transmitted in additional carrier is set by a separate starting symbol indication can be given to a UE. If there is no configuration, if ePDCCH starting symbol is configured, PDSCH starting symbol in additional carrier follows ePDCCH starting symbol in additional carrier. Otherwise, PCFICH of legacy carrier may define the starting symbol of PDSCH in additional carrier or UE assume that the starting symbol of PDSCH in additional carrier is zero.

Some more details on configuring ePDCCH are described in carrier segment.

For, ePDCCH monitoring subframe, there are several ways to support. One way is no ePDCCH support in additional carrier and only PDSCH can be transmitted in additional carrier. Or, ePDCCH monitoring subframe configuration for the legacy carrier can be applied the same configuration to additional carrier if ePDCCH is used in additional carrier. Reconfiguration of ePDCCH PRBs can be performed once additional RBs are configured to an advanced UE. Or separate ePDCCH monitoring subframe configuration for legacy carrier and additional carrier can be set by separately two configurations. Without additional configuration on additional carrier, UE may assume that ePDCCH can be monitored on additional carrier in all subframes. When separate configurations are made and if there is at least one ePDCCH set configured over PRBs in both legacy carrier and additional carrier, UE shall assume that those ePDCCH sets are not monitored in subframes which are not configured to monitor in legacy carrier. In other words, ePDCCH set configured to monitor only in additional carrier are monitored only if ePDCCH set consists of additional carrier PRBs.

ePDCCH set PRB combination needs to be defined. For this, one ePDCCH set consists of either legacy carrier PRBs or additional carrier PRBs. Or, at least localized ePDCCH set consist of either legacy carrier PRBs or additional carrier PRBs, or at least distributed ePDCCH set consists of either legacy carrier PRBs or additional carrier PRBs, any ePDCCH set can consists of mixed PRBs from both legacy carrier and additional carrier. Also only legacy carrier PRBs can be configured to an ePDCCH set is possible, or at least localized ePDCCH set consist of legacy carrier PRBs only. Or, at least distributed ePDCCH set consist of legacy carrier PRBs only.

ePDCCH starting position if ePDCCH set can be configured over additional carrier PRBs can be set as the same ePDCCH starting position as to legacy carrier, or a separate ePDCCH starting position configured to additional carrier which are shared among multiple ePDCCH sets if there are multiple sets are configured. Or, it assumed to be zero all the time unless additional configuration is given to indicate otherwise. In TM10, per ePDCCH set, above three alternatives can be applied with an exception that for second alternative, a separate configuration may be applied only to one ePDCCH set.

ePDCCH number of available REs is set as followings, if an ePDCCH set can consist of both legacy and additional carrier PRBs, all calculation follows the legacy carrier in terms of RS overhead and/or legacy control overhead and/or ePDCCH overhead, separate calculation per PRB, at least for localized ePDCCH set which used the legacy carrier PRB as a reference to calculate available REs and aggregation level, or at least for distributed ePDCCH set which used the legacy carrier RPBs as a reference to calculate available REs and aggregation level.

If an ePDCCH set can be configured this consists of only additional carrier PRBs, available REs are calculated without considering CRS overhead and legacy control overhead if CRS is not transmitted in additional carrier. If CRS or tracking RS is transmitted, overhead to those RSs can be considered.

While, CoMP operation when segment carrier is configured, three options would be possible in terms of system BW used for CoMP operation which can be higher layer configured to indicate which option UE shall assume to limit to legacy carrier BW, to apply to full carrier BW (legacy+carrier segment) when this is used same configuration between legacy and segment carrier may be assumed including MBSFN subframe configurations, or limit to only additional carrier BW when this is used to reduce the size of DCI, system bandwidth for CoMP operation is assumed to be legacy carrier BW. For example, if carrier segment is 10PRB, only 10PRBs are used for resource allocation (starting from 0 to 9). This applies only to CoMP DCI such as DCI format 2D.

Further, when an advanced UE is configured with a carrier segment, it may assume that carrier segment is not used for MBMS services. Thus, it may assume that data can be transmitted in additional carrier even in MBSFN subframes even without configuring TM9 in those MBSFN subframes.

In other words, if an advanced UE is configured with additional carrier which is either configured by higher layer not to be used for MBMS service or predetermined as such, it may expect to receive PDSCH even in MBSFN subframes. Alternatively, the advanced UE with additional carrier configured may expect to receive PDSCH only if it is not receiving MBMS in that MBSFN subframe.

Alternatively, even if this additional carrier is not used for MBMS services, a UE may not expect to receive PDSCH (unless configured to receive TM9 PDSCH) in MBSFN subframes. Furthermore, this alternative may be applicable only to TDD case where in FDD, a UE may expect to receive PDSCH in MBSFN subframes in additional carrier. Or, it may depend on the transmission mode configured to the UE. If a UE is configured with DM-RS based transmission mode, additional carrier may be used for PDSCH even in MBSFN subframes. In terms of transmitting CRS, two options are available in MBSFN subframes. Only two OFDM symbols carry CRS even in additional carrier. All OFDM symbols carry CRS in additional carrier. If two OFDM symbols in additional carrier are used, if PDSCH is supported in additional carrier in MBSFN subframes, only DM-RS based TM (e.g., TM8-10) is supported. If all OFDM symbols are used, if PDSCH is supported in additional carrier in MBSFN subframes, CRS-based TM (e.g., TM1-7) can be supported. When PDSCH is transmitted in additional carrier in MBSFN subframes, the CP used in additional carrier of MBSFN subframes would be same as subframe #0.

As it is, additional carrier can carry only PDSCH, a starting symbol of PDSCH can be start with zero if it is different from a starting symbol of legacy carrier. Or a starting symbol based on PCFICH is set, or a starting symbol based on scheduling ePDCCH is set, but it assumed to be zero in additional carrier basically.

When additional carrier can carry PDSCH+PMCH, the MBSFN configuration is shared between legacy carrier and additional carrier, advanced UE can expect to receive PMCH in additional carrier portion as well. But separate MBSFN configuration for legacy and additional carrier is set that advanced UE can be configured with an MBMS service which is transmitted only over additional carrier.

When additional carrier can carry PDSCH+PMCH+ePDCCH, ePDCCH set cannot be configured to mixed of legacy carrier PRB and additional carrier PRBs. A starting symbol of ePDCCH is based on legacy carrier ePDCCH, legacy carrier PCFICH, or the first ePDCCH set. A number of available RE decision or AL decision is set based on the first ePDCCH set, separate per ePDCCH set based on legacy PRBs if the ePDCCH set includes any legacy carrier PRBs. If multiplexing is allowed between legacy carrier and additional carrier PRBs, full flexible configuration would be feasible as well.

Additional carrier can support CoMP operation, same configuration to additional carrier PRBs to that in legacy carrier for a starting symbol, MBSFN subframe, CRS rate matching, CSI-RS configuration, etc. A separate configuration to additional carrier PRBs, e.g., starting symbol and/or MBSFN subframe and/or CRS rate matching and/or CSI-RS configuration and/or IMR configuration.

Additional carrier segment configuration is set via system information, either by PBCH or SIB, additional carrier can be informed to advanced UEs. When this approach is used, a UE shall assume that additional carrier will be used by default unless it is configured to do otherwise. Or a higher layer signaling can be used. Via ePDCCH set configuration can be used, either per ePDCCH set or common to all ePDCCH set, carrier BW (or the number of PRBs used for PDSCH) can be configured separately. Or DCI can be used, when additional carrier BW is indicated by system information, dynamic change of RA bandwidth may be determined by blind decoding of a DCI by the UE (either legacy carrier BW or full BW).

If carrier segment is used for TDD, additional carrier may be applicable only to downlink subframes. In other words, BW asymmetry between DL subframe and UL subframe may exist in TDD. Or, for uplink subframe, a UE may assume that additional carrier will not be used for either PUCCH or PUSCH. Or the UE may assume that additional carrier will be used only for PUSCH.

Figure 10:
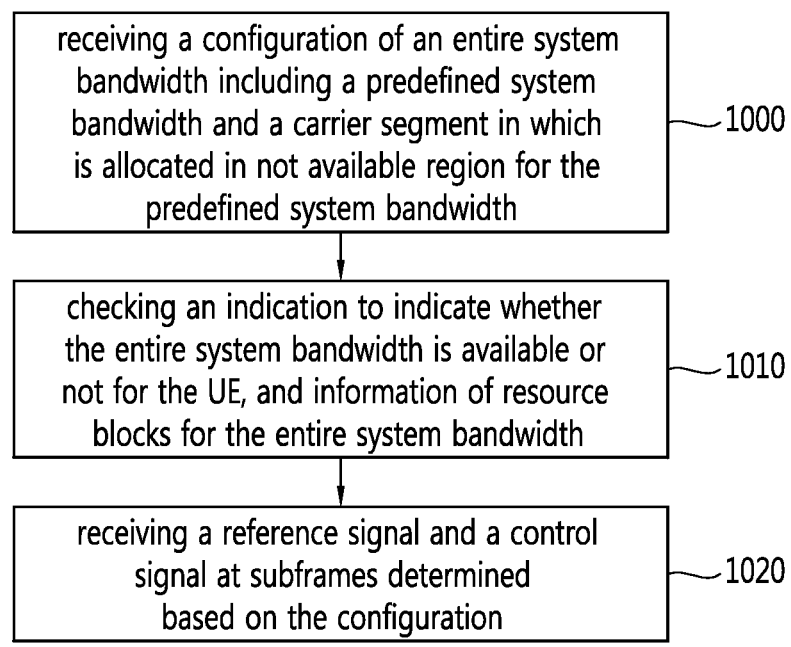
FIG. 10 shows an example of flowchart for determining an entire system bandwidth including a predefined system bandwidth and a carrier segment which the present invention is applied.

FIG. 10 shows an example of flowchart for determining carrier segment of allocation and control/reference signals which the present invention is applied.

Referring to FIG. 10, a UE receives a configuration of an entire system bandwidth including a predefined system bandwidth and a carrier segment in which is allocated in not available region for the predefined system bandwidth, the configuration is set with separate two configurations for the predefined system bandwidth and the one for a carrier segment each or, one new configuration for the entire system bandwidth by summing the predefined system bandwidth and the carrier segment (1000). The configuration of the entire system bandwidth is received by a serving cell (Scell) configuration, a transmission mode (TM) configuration, or a radio resource control (RRC) configuration.

Especially, the UE can assume that the configuration of the entire system bandwidth is set or not by determining comparison a number of available resource blocks for the entire system bandwidth and a threshold for the predefined system bandwidth. For example, when the ePDCCH set of PRB in the predefined system bandwidth is preset and if the configuration of ePDCCH set of PRB for the entire system bandwidth is larger than the ePDCCH set PRB of the predefined system bandwidth, it mean that the carrier segment is configured newly to perform ePDCCH detection.

And then, the UE received or determines an indication to indicate whether the entire system bandwidth is available or not for the UE to use the entire system bandwidth in the configuration (1010). The UE checks ePDCCH monitoring subframe, ePDCCH set PRB combination, ePDCCH starting position, MBSFN configuration, CSI-RS configuration, PBCH modification, TM configuration in the carrier segment area of the entire system bandwidth (1010). The UE checks that values each (or index) for the ePDCCH monitoring subframe, ePDCCH set PRB combination, ePDCCH starting position, MBSFN configuration, CSI-RS configuration, PBCH modification, TM configuration in the carrier segment is identical with values each (or index) for the ePDCCH monitoring subframe, ePDCCH set PRB combination, ePDCCH starting position, MBSFN configuration, CSI-RS configuration, PBCH modification, TM configuration in the predefined system bandwidth of the entire system bandwidth. So the UE can detect same locations or different location to be applied same scheme according to the configuration. Wherein the indication to indicate whether the entire system bandwidth is available or not for the UE is received by system information, or one among a DCI format 0, a DCI format 1A, a DCI format 2C, a DCI format 2D, and a DCI format 4 having the number of available resource blocks for the entire system bandwidth.

Herein, the UE determines whether different TM configurations of a Physical Downlink Control Channel (PDCCH) and an enhanced PDCCH (ePDCCH) for the predefined system bandwidth and a bandwidth of the carrier segment are set, or a TM configuration for the entire system bandwidth is set. Also, the UE determines whether ePDCCH monitoring subframes in the carrier segment are configured or not, it includes that the ePDCCH monitoring subframes in the carrier segment is the same as the ePDCCH monitoring subframes in the predefined system bandwidth. Further the UE determines that a MBSFN configuration, a CSI-RS configuration, and/or an ePDCCH starting position in the carrier segment are configured or not, and the MBSFN configuration is same as a MBSFN configuration, a CSI-RS configuration, and/or an ePDCCH starting position in the predefined system bandwidth. In other words, the UE can check that PRB configurations of PDCCH configuration, ePDCCH configuration, MBSFN configuration, RS configuration, and power in the carrier segment is configured with separate or same configurations of the predefined system bandwidth.

Thus, the UE can receive a reference signal and a control signal at subframes determined based on the indication and the information (1020).

Figure 11:
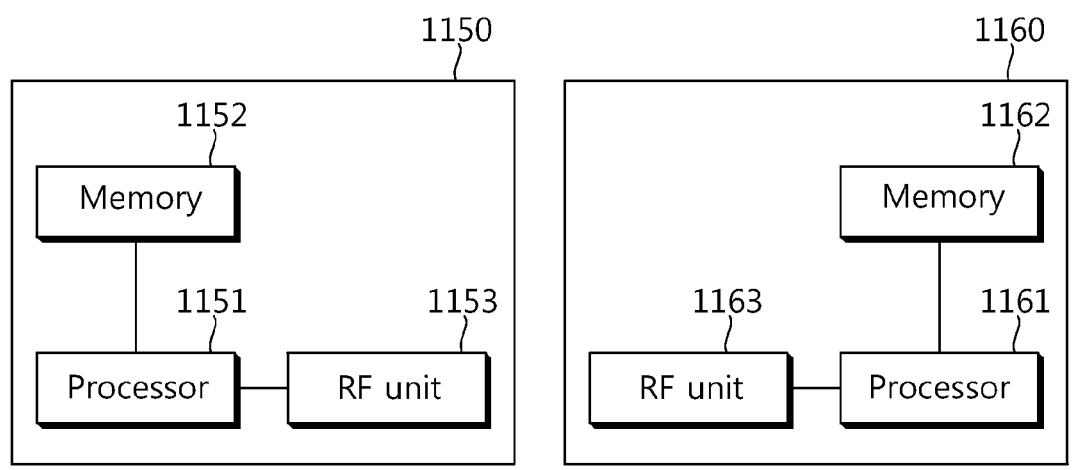
FIG. 11 shows a block diagram showing a wireless communication system according to an exemplary embodiment of the present invention.

FIG. 11 is a block diagram showing a wireless communication system according to an embodiment of the present invention.

A BS 1150 includes a processor 1151, a memory 1152, and a radio frequency (RF) unit 1153. The memory 1152 is coupled to the processor 1151, and stores a variety of information for driving the processor 1151. The RF unit 1153 is coupled to the processor 1151, and transmits and/or receives a radio signal. The processor 1151 implements the proposed functions, procedures, and/or methods. In the embodiments of FIG. 2 to FIG. 10, the operation of the BS can be implemented by the processor 1151.

The processor 1151 configures an ePDCCH set to monitor in a predefined system bandwidth, additional carrier as a carrier segment, or an entire system bandwidth including the predefined system bandwidth and the additional carrier, the ePDCCH set consists of additional carrier PRBs. The ePDCCH set is configured with a localized ePDCCH set in legacy carrier (predefined system bandwidth) PRBs and additional carrier (carrier segment) PRBs each or a distributed ePDCCH set in the legacy carrier PRBs or the additional carrier PRBs. The ePDCCH starting position in the additional carrier can be set as the same ePDCCH starting position in the legacy carrier. Also the processor 1151 can configure PDCCH and ePDCCH of different/same transmission modes.

And the processor 1151 can configure MBSFN usage of the predefined system bandwidth and the additional carrier as a carrier segment to supports MBMS services. That is, processor 1151 can control a PBCH modification in the additional carrier.

The wireless device 1160 includes a processor 1161, a memory 1162, and an RF unit 1163. The memory 1162 is coupled to the processor 1161, and stores a variety of information for driving the processor 1161. The RF unit 1163 is coupled to the processor 1161, and transmits and/or receives a radio signal. The processor 1161 implements the proposed functions, procedures, and/or methods. In the embodiments of the FIG. 2 to FIG. 10, the operation of the UE can be implemented by the processor 1161. First of all, the processor 1161 may configure one or more cells with different frequencies, for this invention the processor 1161 configures the cells to support Semi-Persistent Scheduling, TTI-bundling, HARQ-ACK procedures. Later, the processor 1151 may receive, check and configure configurations for RS signals on a first cell and a second cell, in addition to, an advanced type of configurations or a set of for RS configurations of RS signals between the first cell and the second cell to support more fine a time and a frequency tracking by the UE.

Especially, the processor 1161 configures an ePDCCH set to monitor in a predefined system bandwidth, additional carrier as a carrier segment, or an entire system bandwidth including the predefined system bandwidth and the additional carrier, the ePDCCH set consists of additional carrier PRBs. The ePDCCH set is configured with a localized ePDCCH set in legacy carrier (predefined system bandwidth) PRBs and additional carrier (carrier segment) PRBs each or a distributed ePDCCH set in the legacy carrier PRBs or the additional carrier PRBs. The ePDCCH starting position in the additional carrier can be set as the same ePDCCH starting position in the legacy carrier. Also the processor 1161 can configure PDCCH and ePDCCH of different/same transmission modes.

And the processor 1161 can configure MBSFN usage of the predefined system bandwidth and the additional carrier as a carrier segment to supports MBMS services. That is, processor 1161 can control a PBCH modification in the additional carrier.

For this, the processor 1161 can determine that the configuration of the entire system bandwidth is set or not by determining comparison a number of available resource blocks for the entire system bandwidth and a threshold for the predefined system bandwidth. For example, when the ePDCCH set of PRB in the predefined system bandwidth is preset and if the configuration of ePDCCH set of PRB for the entire system bandwidth is larger than the ePDCCH set PRB of the predefined system bandwidth, it mean that the carrier segment is configured newly to perform ePDCCH detection.

Further, the processor 1161 can determine an indication to indicate whether the entire system bandwidth is available or not for the UE to use the entire system bandwidth in the configuration so that ePDCCH monitoring subframe, ePDCCH set PRB combination, ePDCCH starting position, MBSFN configuration, CSI-RS configuration, PBCH modification, or TM configuration in the carrier segment area of the entire system bandwidth is checked. Wherein the processor 1161 can determine that the indication is received by system information, or one among a DCI format 0, a DCI format 1A, a DCI format 2C, a DCI format 2D, and a DCI format 4 having the number of available resource blocks for the entire system bandwidth.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing, by a user equipment (UE), resource allocation in a wireless communication system, the method comprising:
    receiving a configuration of an entire system bandwidth, the entire system bandwidth including a predefined system bandwidth and a carrier segment which is bandwidth not available to be the predefined system bandwidth;
    checking, in the configuration, information for the entire system bandwidth and an indication that indicates whether or not the entire system bandwidth is available for the UE; and
    receiving a reference signal and a control signal at subframes determined based on the indication and the information,
    wherein the configuration of the entire system bandwidth is determined by comparing a number of available resource blocks for the entire system bandwidth and a predetermined threshold.

2. The method of claim 1, wherein the configuration of the entire system bandwidth is received by a serving cell (Scell) configuration, a transmission mode (TM) configuration, or a radio resource control (RRC) configuration.

3. The method of claim 1, wherein the indication is received by system information, or one among a DCI format 0, a DCI format 1A, a DCI format 2C, a DCI format 2D, and a DCI format 4.

4. The method of claim 1, wherein checking the information includes:
    determining whether different TM configurations of a Physical Downlink Control Channel (PDCCH) and an enhanced PDCCH (ePDCCH) for the predefined system bandwidth and a bandwidth of the carrier segment are set, or a TM configuration for the entire system bandwidth is set.

5. The method of claim 4, wherein checking the information further includes:
    determining whether or not ePDCCH monitoring subframes in the carrier segment are configured.

6. The method of claim 5, wherein checking the information further includes:
    determining whether Multicast-broadcast single-frequency network (MBSFN) subframes in the carrier segment are configured or not.

7. The method of claim 6, wherein checking the information further includes:
    determining whether a channel state information (CSI)-reference signal (RS) configuration in the carrier segment is identical with a CSI-RS configuration in the predefined system bandwidth.

8. The method of claim 7, wherein checking the information further includes:
    determining whether an ePDCCH starting position in the carrier segment is identical with an ePDCCH starting position in the predefined system bandwidth.

9. The method of claim 1, wherein the entire system bandwidth includes at least two predefined system bandwidths and the carrier segment, wherein a predefined system bandwidth corresponds to a serving cell, and
    wherein the predefined system bandwidth includes one of 1.4 MHz, 3 MHz, 5 MHz, 10 MHz, and 20 MHz and the carrier segment includes 1 MHz or 6 MHz.

10. A user equipment for performing resource allocation in a wireless communication system, the UE comprises:
    a radio frequency (RF) unit for transmitting and receiving a radio signal; and
    a processor operatively coupled to the RF unit, that:
    controls the RF unit to receive a configuration of an entire system bandwidth, the entire system bandwidth including a predefined system bandwidth and a carrier segment which is bandwidth not available to be the predefined system bandwidth;
    checks, in the configuration, information for the entire system bandwidth and an indication that indicates whether or not the entire system bandwidth is available for the UE; and
    controls the RF unit to receive a reference signal and a control signal at subframes determined based on the indication and the information,
    wherein the configuration of the entire system bandwidth is determined by comparing a number of available resource blocks for the entire system bandwidth and a predetermined threshold.

11. The UE of claim 10, wherein the configuration of the entire system bandwidth is received by a serving cell (Scell) configuration, a transmission mode (TM) configuration, or a radio resource control (RRC) configuration.

12. The UE of claim 10, wherein the further:
    determines whether different TM configurations of a Physical Downlink Control Channel (PDCCH) and an enhanced PDCCH (ePDCCH) for the predefined system bandwidth and a bandwidth of the carrier segment are set, or a TM configuration for the entire system bandwidth is set;
    determines whether or not ePDCCH monitoring subframes in the carrier segment are configured;
    determines whether or not Multicast-broadcast single-frequency network (MBSFN) subframes in the carrier segment are configured;
    determines whether a channel state information (CSI)-reference signal (RS) configuration in the carrier segment is identical with a CSI-RS configuration in the predefined system bandwidth; or determines whether an ePDCCH starting position in the carrier segment is identical with an ePDCCH starting position in the predefined system bandwidth.

13. The UE of claim 10, wherein the entire system bandwidth includes at least two predefined system bandwidths and the carrier segment, wherein a predefined system bandwidth corresponds to a serving cell, and wherein the predefined system bandwidth includes one of 1.4 MHz, 3 MHz, 5 MHz, 10 MHz, and 20 MHz and the carrier segment includes 1 MHz or 6 MHz.

* * * * *